Patented Jan. 12, 1954

2,666,038

UNITED STATES PATENT OFFICE 2,666,038

TEXTILE-FINISHING COMPOSITIONS, FINISHED ARTICLES, AND METHODS OF PRODUCING THEM

John B. Eisen, Waterloo, Wis., assignor to American Viscose Corporation, Wilmington, Del., a corporation of Delaware No Drawing. Application August 8, 1950, Serial No. 178,361

20 Claims. (Cl. 260—23)

This invention relates to compositions for dressing and finishing textile yarns, cords, fabrics and other articles, such as paper, felts, and films, such as sheets of cellophane. It is particularly concerned with compositions which are adapted to prepare the articles to which they are applied for further treatment with coatings of various kinds, such as, in the case of the preparation of tire cords, with a rubber latex composition. However, the compositions are also adaptable for the dressing of articles for temporary purposes such as for the lubricating or sizing of yarns in weaving and knitting processes, after which the composition is to be removed. The invention also contemplates the articles carrying the composition and methods of producing the articles. This application is a continuation-in-part of my copending application Serial No. 39,998, filed July 21, 1948 and now abandoned.

One object of the present invention is to provide an oil-in-water emulsion which is readily dilutable so that it can be applied to either dry or extremely wet materials, whether yarns, fabrics, or the like, without danger of undergoing separation into phases, precipitation of components therein, or coagulation. A further object of the invention is to provide a conditioning composition for textile and other articles which is not water-repellent so that the dressed articles readily accept further coatings from aqueous media such as rubber latex in the production of cords which can be used in the production of rubber articles such as tires, belts, hose, and the like. A further object is to provide an oil-in-water emulsion of sufficient versatility that it can be applied in different concentrations to various articles for numerous purposes, as will appear more particularly hereinafter. A further object is to provide improved products carrying the composition of the present invention and to provide methods of producing such improved products. Other objects and advantages will be apparent from the description hereinafter.

In accordance with the present invention, a finishing or dressing composition is formed of an oil-in-water emulsion and comprises a predominantly naphthenic mineral oil as the oil phase, a water-soluble or dispersible binding colloid, a water-soluble or dispersible solid ester having a melting point of at least 30° C., of a fatty acid containing at least 12 carbon atoms with a polyhydric alcohol or an anhydro polyhydric alcohol as an emulsifier or emulsion stabilizer, and optionally an alkaline buffer, preferably having lubricating properties.

In the emulsion any predominantly naphthenic mineral oil may be used. By "predominantly naphthenic" is meant a mineral oil containing at least 51% by weight of naphthenic components and it may include an oil which is entirely naphthenic in character. Small amounts of other oils such as vegetable, animal, fish, or even paraffinic mineral oils may be included, but in the oil phase, the naphthenic component should be predominant, i. e., in an amount at least 51% by weight. Preferably, the naphthenic components of the oil should be at least 75% by weight.

As the water-soluble or dispersible binding colloid, there may be used polyvinyl alcohol and/or copolymers of styrene and fumaric (maleic) acids, (such as the product available under the trade name "Stymer"), polymethacrylic acid, polyvinyl acetates which have been partially deacylated sufficiently to render them water-dispersible or preferably water-soluble, also the salts of such copolymers and polymers, gelatine, chromated gelatines, starch, and starch degradation products such as dextrines.

As the solid ester there are employed the esters of the hexahydric alcohols and the anhydro derivatives thereof such as sorbitol, mannitol, dulcitol, sorbitan, mannitan, sorbide, mannide, and the like. The fatty acid portion of the ester is advantageously derived from the long-chain fatty acids including lauric, myristic, palmitic, stearic, oleic, ricinoleic, and the like. The esters may be either predominantly mono-, di-, tri-esters, or mixtures thereof and should have a melting point above 30° C. Examples of specific esters are sorbitol tetrastearate, sorbitan monopalmitate, sorbitan monolaurate, mannitan monopalmitate, mannide monooleate, sorbide dipalmitate, sorbide distearate, sorbide monomyristate, and sorbitan monostearate.

As the alkaline buffer, the alkali metal salts of the higher fatty acids having at least 12 carbon atoms are lubricous and extremely valuable, such as sodium oleate, sodium palmitate, sodium laurate and sodium stearate. Amines, such as hydroxyalkyl amines of which triethanol amine and tris-hydroxy methylamino methane are representative, are useful though not lubricous while long-chain fatty amines such as lauryl, myristyl, hexadecyl, and octodecyl amines are lubricating buffers. The buffer is used when the textile material to which the composition is applied may contain residual acid, such as freshly spun and inadequately washed regenerated cellulose rayon yarns. When no acid is present on the textile materials, either because of its nature or as a result of complete washing out in the case of regenerated cellulose rayon yarns, the buffer need not be used.

The proportions of the several ingredients in the emulsion are as follows:

| | Percent by weight |
|---|---|
| Oil | 0.4 to 2 |
| Binding colloid | 0.1 to 2 |
| Ester | 0.1 to 0.5 |
| Buffer (when used) | 0.1 to 1.5 |
| Water, balance to make 100. | |

In addition, it is important that the ratio of ester to the oil be carefully observed and maintained between 3 and 5 parts by weight of ester to 16 parts of oil. The amount of ester should not be below 3 parts per 15 of oil because in such proportion the emulsion is insufficiently stable and when the composition is used for making tire cords, the tensile strength of the oven-dry or practically bone-dry cord is sacrificed. On the other hand, more than 5 parts of the ester per 16 parts of oil must be avoided since it has been found, surprisingly, that when the higher proportion of ester is used, the cord becomes water-repellent so that it cannot pick up the latex uniformly and in sufficient quantities to prepare the cord for embedding rubber articles.

Mention has been made that the oil should be predominantly naphthenic. This has been found extremely important. A paraffinic oil interferes with the ability of the treated cord to accept latex. Not only does the latex pick-up or take-up become inadequate, but it becomes non-uniform. In this respect, the ester and paraffinic oil interfere with each other. Thus, if sufficient of the ester is employed to impart satisfactory high oven-dry tensile strength to the treated cord, it is impossible to incorporate any proportion of paraffinic oil without rendering the yarn too water-repellent to allow of uniform and adequate latex pick-up. The naphthenic components when present in predominant proportions in the oil also blend with the other components in the dried product so as to provide homogeneity therein which is lacking when a lower proportion of naphthenic oil is present.

The composition is applied to the articles for various purposes. The concentration given in the table above is entirely suitable when applying the material to wet filaments or yarns in amounts satisfactory for the production of tire cord, in which application, the amount of dressing upon the dried article is generally from about ¼ to 5% and preferably between ½ and 2% by weight of the yarn. The same concentration may be used for applying a knitting finish for lubricating purposes to dry yarns. For some other purposes, the concentration is preferably increased. For example, the concentration may be as much as doubled when it is desired to use the composition for warp-sizing of yarns. The concentration may be doubled or even almost tripled in applying it to yarns or cords having a lively twist, such as tire cords, or crepe-twisted yarns having 25 to 75 turns per inch twist, for the purpose of setting the twist therein. The amount of dressing upon the yarn in the case of warp-sizing may vary from 5 to 15% by weight of the yarn, whereas in twist-setting 5 to 25% of the composition by weight of the yarn may be present.

The composition, as stated, may be applied to various articles. For example, it may be applied to untwisted bundles of filaments which may be in the wet or dry condition. For example, it may be applied to the freshly spun regenerated cellulose rayon filament bundles having from 40 to 1200 or more denier size. The larger denier yarns, say from 500 to 2,000 denier, may receive the composition of the present invention before their first drying and before their twisting. The composition is also advantageous for the application to freshly spun artificial filaments which are collected without twist or with very low twist when first produced. By applying the composition to the freshly spun filaments before collection, the binder colloid in the composition imparts sufficient body to the dried product to hold the filaments together and thereby the application in this instance serves to facilitate subsequent unwinding of the collected package of yarn while preventing rupture of filaments therein which would otherwise be caused by any overlapping and interlocking or tangling of filaments which contact one another in adjacent convolutions of the package. By applying the composition to the relatively untwisted yarns before collection, the filaments in the individual yarns are bound together and prevented from catching on the filaments of adjacent yarns.

The composition may be applied to yarns comprising filaments of regenerated cellulose produced from viscose, cuprammonium cellulose, nitrocellulose, and the like, or of cellulose esters, such as cellulose acetate, propionate or cellulose propionate butyrate; cellulose ethers, such as ethyl cellulose, benzyl cellulose, either of the solvent-soluble type or of the water-insoluble, alkali-soluble type; casein or other proteins, synthetic resins, such as nylon, polyvinyl chloride, polyvinylidene chloride, polyacrylonitrile, polyethylene, and also copolymers of vinyl chloride, with vinyl acetate, acrylonitrile, vinylidene chloride, and the like. The composition may also be applied to yarns comprising fibers of natural origin, such as cotton, wool, silk and the like. The composition may be applied to any of the synthetic or natural fiber yarns, or cords or fabrics formed therefrom, for any of the purposes mentioned hereinabove, such as for a knitting lubricant, a tire cord preparatory finish, a warp-size, or the like. The composition may be applied in any of the concentrations mentioned hereinabove to other articles such as papers, felts, cellophane or cellulose acetate sheets as a priming coating to facilitate the acceptance by the article of a subsequent coating of other material, such as a rubber latex.

In the specific application of the composition for the formation of tire cord, the composition may be applied to individual multi-filament bundles either in twisted or untwisted condition which are later plied together into a multi-ply cord structure. In the plying, the individual yarns may be given any twist as in a separate step preliminary to the final doubling into the form of cording. Also, the individual yarn after being twisted singly may be plied into strands, several of which are later plied into a final cord.

In the following examples which are illustrative of the invention, the parts are given by weight.

EXAMPLE I

Polyvinyl alcohol (3.8 parts) was dissolved in 100 parts of water, and 3 parts of sodium oleate were added with stirring. Sorbitan mono-palmitate (1.5 parts) and mineral oil (6 parts) were melted together. The first solution was added with agitation to the second solution and an emulsion resulted which is hereinafter referred to as a stock emulsion for convenience.

This stock emulsion was then diluted with 880 parts of water and was then applied to a wet, freshly spun and processed 1100 denier, 480 filament viscose rayon yarn while it was in untwisted condition on the last stage of treatment on a thread-advancing thread-storage reel just prior to the drying stage of a continuous rayon spinning and processing machine, as described, for example, in application Serial No. 532,328, filed April 22, 1944, now Patent 2,516,157. The yarn then passed to a succeeding thread-advancing thread-storage device upon which it was dried. Thereafter the yarn was collected without twist. The resulting yarn was thereafter twisted to a total of 14 turns per inch of Z-twist and two strands of the resulting yarn were then plied together with about 11½ turns per inch in the opposite direction. The resulting cord, containing about 1% by weight of the composition, had a high oven-dry tensile strength, excellent fatigue resistance, excellent latex pick-up, and good adhesion to rubber in the final product.

EXAMPLE II

The stock emulsion obtained in Example I was diluted with 700 parts of water and then applied by means of rollers dipping into a container of the emulsion, to a warp of yarn and dried. The warp containing 10% of the composition by weight of the yarn was woven with complete satisfaction.

EXAMPLE III

The emulsion made in accordance with Example I but containing 10 parts of polyvinyl alcohol instead of 3.8 was diluted to a concentration of 25% and applied to crepe-twisted yarns including 150 denier, 75 filament rayon yarns having 60 turns of twist per inch, such yarns having a lively twist prior to treatment, and after drying the composition on the yarns, they were found to contain approximately 14% by weight of the twist-setting medium based on the weight of the yarn. The yarn could then be used in knitting full-fashioned hosiery and making woven crepe fabrics without any tendency to exhibit liveliness of twist during the operation.

EXAMPLE IV

The stock emulsion obtained in Example I and diluted with 600 parts of water was applied to a multi-filament bundle of untwisted cellulose acetate filaments proceeding from the cell of a dry spinning system prior to collection of the bundle. The yarn as it passed from the point of application to the point of collection was passed about a thread-advancing thread-storage device on which it was dried and after collection it was found to contain 3% of the dressing by weight of the yarn. The collected package of yarn was then passed through a rewinding operation in which no trouble was encountered in respect to the tendency, during unwinding, of the filaments to tangle in adjacent convolutions of the yarn on the original collection package.

EXAMPLE V

The stock emulsion obtained as in Example I was diluted with 500 parts of water and was applied to a sewing thread of cotton. It was applied during the rewinding operation and was dried continuously as it proceeded from the point of application to the rewinding package. The thread received a coating of 7% by weight of the yarn.

EXAMPLE VI

A cellophane sheet was passed through a bath containing the stock emulsion obtained in Example I and diluted with 1200 parts of water. Thereafter, the coated sheet was dried and passed through a latex bath to produce a rubber coating thereon. The product was dried and vulcanized and was found to be waterproof. The product was useful as a rug anti-slip base, other friction materials, wall coverings, children's schoolbooks, brief cases and the like.

EXAMPLE VII

The procedure of Example VI was followed except that the cellophane base sheet was replaced with woven and knitted rayon fabrics respectively. The resulting materials were useful as a material for making raincoats, moisture-proof aprons, bathing caps, and baby pants.

EXAMPLE VIII

A stock emulsion was made up as in Example I omitting the sodium oleate and was diluted with 700 parts of water and then applied by means of rollers dipping into a container of the emulsion, to a warp of yarn and dried. The warp containing 10% of the composition by weight of the yarn was woven with complete satisfaction.

It is to be understood that changes and variations may be made without departing from the spirit and scope of the invention as defined in the appended claims.

I claim:

1. An oil-in-water emulsion comprising 4 to 20 parts by weight of an oil which is predominantly a naphthenic mineral oil, 1 to 20 parts by weight of a water-dispersible polymeric colloid, 1 to 5 parts by weight of an ester of a fatty acid containing at least 12 carbon atoms with a polyhydric alcohol selected from the group consisting of hexahydric alcohols and their anhydro derivatives, the proportion of ester being not less than 3 parts nor more than 5 parts per 16 parts of oil, and water.

2. The emulsion of claim 1 in which the colloid is polyvinyl alcohol.

3. An oil-in-water emulsion comprising 4 to 20 parts by weight of an oil which is predominantly a naphthenic mineral oil, 1 to 20 parts by weight of a water-dispersible polymeric colloid, 1 to 5 parts by weight of an ester of a fatty acid containing at least 12 carbon atoms with a polyhydric alcohol selected from the group consisting of hexahydric alcohols and their anhydro derivatives, the proportion of ester being not less than 3 parts nor more than 5 parts per 16 parts of oil, 1 to 15 parts by weight of an alkaline buffer, and water.

4. The emulsion of claim 3 in which the colloid is polyvinyl alcohol.

5. The emulsion of claim 3 in which the buffer is a sodium salt of a fatty acid having at least 12 carbon atoms.

6. The emulsion of claim 3 in which the buffer is sodium oleate.

7. The emulsion of claim 6 in which the colloid is polyvinyl alcohol.

8. An oil-in-water emulsion comprising 4 to 20 parts by weight of an oil which is exclusively a predominantly naphthenic mineral oil, 1 to 20 parts by weight of a water-dispersible polyvinyl alcohol, 1 to 5 parts by weight of an ester of a fatty acid containing at least 12 carbon atoms with a polyhydric alcohol selected from the group consisting of hexahydric alcohols and their anhydro derivatives, the proportion of ester being not less than 3 parts nor more than 5 parts per 16 parts of oil, 1 to 15 parts by weight of an alkaline lubricating buffer, and water.

9. The emulsion of claim 8 in which the buffer is sodium oleate.

10. As an article of manufacture, a flexible base material carrying ¼ to 25% by weight of a coating composition thereon comprising 4 to 20 parts by weight of an oil which is predominantly a naphthenic mineral oil, 1 to 20 parts by weight of a water-dispersible polymeric colloid, 1 to 5 parts by weight of an ester of a fatty acid containing at least 12 carbon atoms with a polyhydric alcohol selected from the group consisting of hexahydric alcohols and their anhydro derivatives, the proportion of ester being not less than 3 parts nor more than 5 parts per 16 parts of oil, and 1 to 15 parts by weight of an alkaline lubricating buffer.

11. The article of claim 10 in which the base is a textile strand.

12. The article of claim 10 in which the base is a tire cord of at least 500 denier.

13. The article of claim 10 in which the base is a tire cord of regenerated cellulose of at least 500 denier.

14. The article of claim 10 in which the base is a yarn.

15. The article of claim 10 in which the base is a yarn of untwisted filaments.

16. The article of claim 10 in which the base is a textile fabric.

17. The article of claim 10 in which the base is a sheet of cellophane.

18. As an article of manufacture, a flexible base material carrying ¼ to 25% by weight of a coating composition thereon comprising 4 to 20 parts by weight of an oil which is predominantly a naphthenic mineral oil, 1 to 20 parts by weight of a water-dispersible polymeric colloid, and 1 to 5 parts by weight of an ester of a fatty acid containing at least 12 carbon atoms with a polyhydric alcohol selected from the group consisting of hexahydric alcohols and their anhydro derivatives, the proportion of ester being not less than 3 parts nor more than 5 parts per 16 parts of oil.

19. The article of claim 18 in which the base is a textile strand.

20. The article of claim 18 in which the base is a tire cord of at least 500 denier.

JOHN B. EISEN.

No references cited.